No. 851,517. PATENTED APR. 23, 1907.
J. A. HILDEBRAND.
MECHANISM FOR PROPELLING VEHICLES OVER LAND OR WATER.
APPLICATION FILED SEPT. 27, 1906.
3 SHEETS—SHEET 2.
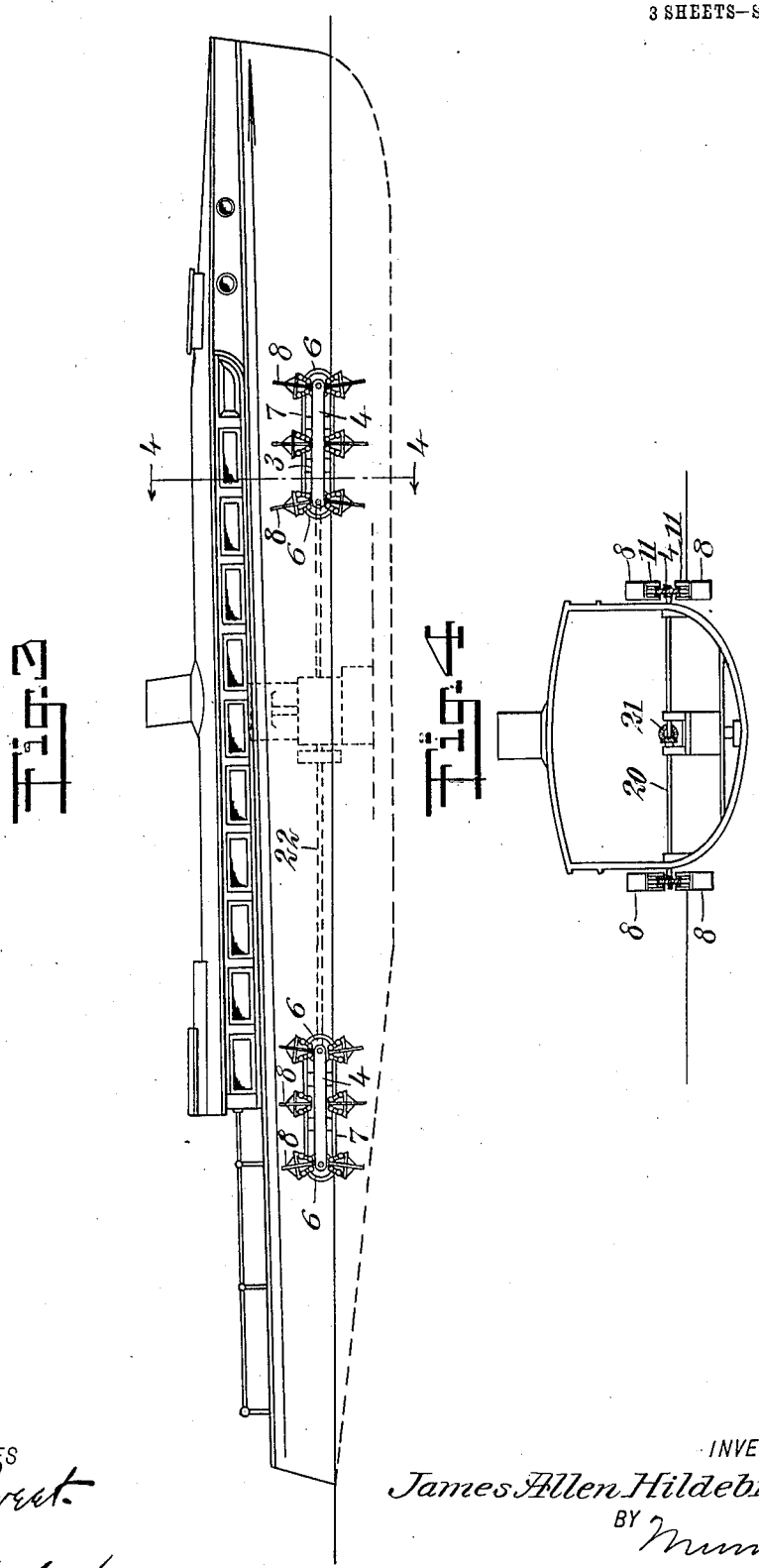
WITNESSES
F. D. Sweet.
C. W. Fairbank
INVENTOR
James Allen Hildebrand
BY Munn & Co
ATTORNEYS

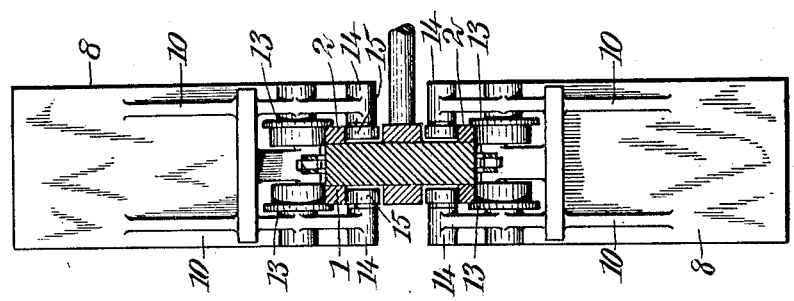

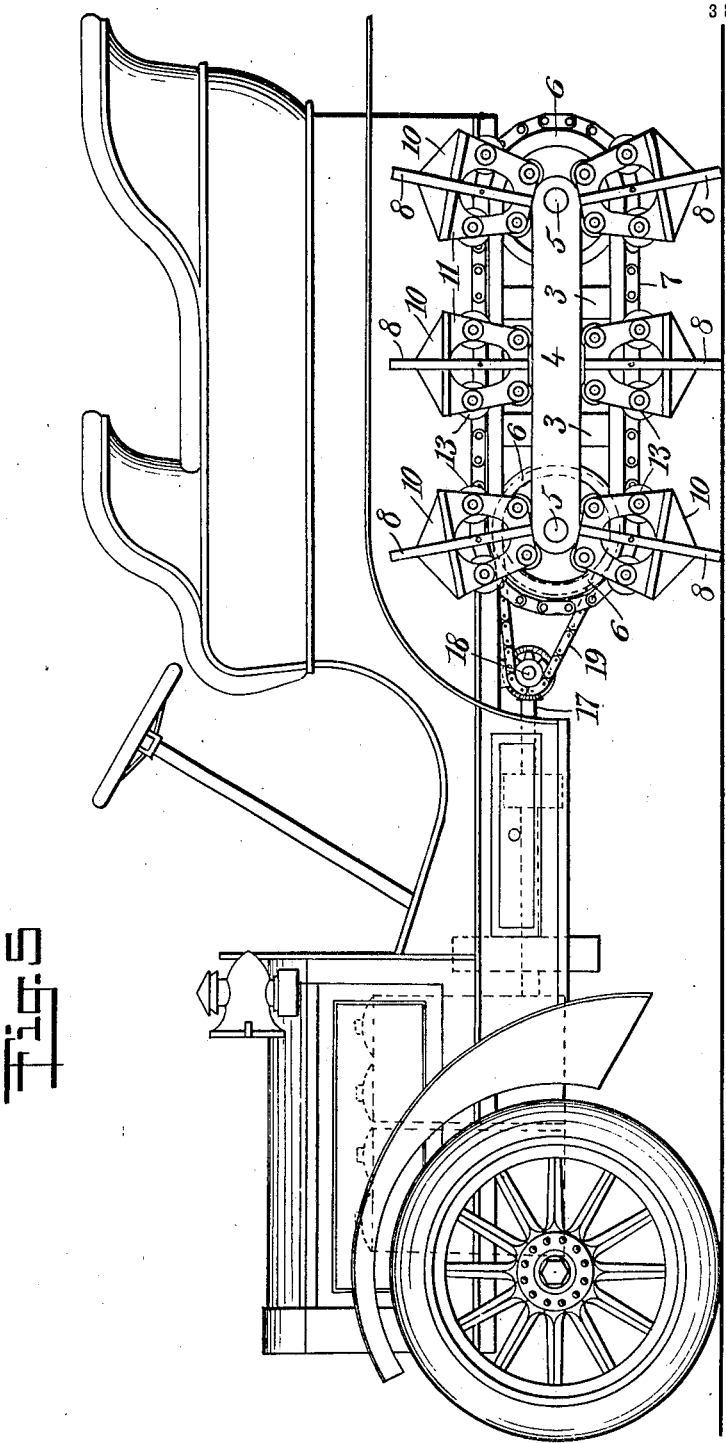

UNITED STATES PATENT OFFICE.

JAMES ALLEN HILDEBRAND, OF OLYMPIA, WASHINGTON.

MECHANISM FOR PROPELLING VEHICLES OVER LAND OR WATER.

No. 851,517.  Specification of Letters Patent.  Patented April 23, 1907.

Application filed September 27, 1906. Serial No. 336,419.

*To all whom it may concern:*

Be it known that I, JAMES ALLEN HILDEBRAND, a citizen of the United States, and a resident of Olympia, in the county of Thurston and State of Washington, have invented a new and Improved Mechanism for Propelling Vehicles over Land or Water, of which the following is a full, clear, and exact description.

This invention relates to certain improvements in mechanism adapted to be applied to boats, vehicles, and the like, whereby they may be propelled with equal facility over the surface of the land, or upon the water, and relates more particularly to the specific details of this propelling means.

Reference is to be had to the accompanying drawings forming a part of this specification, in which similar characters of reference indicate corresponding parts in all the figures, in which Figure 1 is a side elevation of my improved propelling means; Fig. 2 is a vertical section on the line 2—2 of Fig. 1; Fig. 3 is a side elevation of a boat provided with my improved propelling means; Fig. 4 is a vertical section on the line 4—4 of Fig. 3; and Fig. 5 is a side elevation of a touring car provided with my improved propelling means.

My invention comprises a suitable endless track 1, carried by the vehicle to which my improved invention may be applied, and provided with means traveling along said track and adapted to contact with either the ground and support and convey the vehicle when the latter is traveling upon the land, or to serve as paddles and contact with the water to propel a vessel when the improvement is applied to a vehicle adapted for traveling over the sea. As the very same propelling means is employed in either case, it is evident that it may be applied to a vehicle which is adapted for traveling either over the land or sea, and thus the intervention of streams or lakes would in no way impede the progress of the traveler were his vehicle equipped with my improved device.

The track is preferably rigidly secured to the side of the vehicle, and formed of two members 1 and 2, extending parallel and having the upper and lower portions extending in a straight line and connected at the end by semi-circular portions. The opposite sides of the two members are connected by cross braces 3, lying between the members, and these cross braces are connected by two main longitudinal members 4, provided with journals at their ends for supporting shafts 5, carrying sprocket wheels 6, lying between the two members of the track, and having their outer circumferences lying substantially parallel to the curved end portions of the track. Either one or both of the shafts extends beyond the end of the longitudinal member 4, lying next adjacent the wall of the vehicle, and is connected to any suitable source of power for rotating the sprocket wheel carried by said shaft. Surrounding the two sprocket wheels and lying substantially parallel to the track throughout its entire length, is a chain 7, having the paddle or propelling portions secured thereto and carried thereby along the track. Each of these paddles comprises a thin flat blade 8, extending at substantially right angles to the chain, and having suitable means for securing it to said chain and providing for its movement along the track. Preferably, the blade portion 8 is secured to or is integral with a plate 9 at right angles thereto, and having braces 10 connecting the blade and the plate to strengthen the former.

Extending outward from the surface of the plate 9 and in the opposite direction from the blade 8, are two arms 11, of any suitable construction and having journals 12 for rollers 13 mounted on the inner side of the arms. These rollers 13 are adapted to rest upon the outer side of the track, and are provided with flanges engaging with the outer side of the track to prevent lateral displacement. The arms extend beyond the track, and are provided with journals 14 for supporting smaller rollers 15, adapted to engage with the inner side of the track and prevent the removal of the propelling means therefrom. The side arms of the propelling means are provided with means for securing the latter to the chain 7, and for accomplishing this any suitable means may be provided, but preferably I extend a link bolt of the chain to a short distance beyond the sides of the chain and mount the ends in journals 16 on the side arms. Upon rotating either or both of the sprocket wheels 6, the chain is caused to travel along parallel to the track, and as the propelling means are carried by the chain, it is evident that they will be moved along the track in one direction from one sprocket wheel to the other and along the track in the opposite direction on the return.

When the device is secured to a traction vehicle, as for instance, an automobile, as shown in Fig. 5, the drive shaft 17 of the engine is preferably geared to a main cross shaft 18, which latter is connected by a suitable drive chain 19 to a sprocket wheel, not shown, upon the cross shaft 5 propelling the front sprocket wheels 6 on opposite sides of the vehicle. As the sprocket wheels rotate in the proper direction, the propelling means travel around the sprocket to the lower side thereof where they come in contact with the ground, and as the friction prevents their slipping back over the ground as the sprocket wheels continuously rotate, the vehicle is in consequence moved forward. The front shaft 5 may, if desired, be connected by suitable sprocket and chain to the back shaft 5 for more equally distributing the power applied.

In the operation of my improved device upon a boat or other vessel, the parts are attached to the side of the hull slightly above the water line, so that the propelling means travel backward in the water, and travel forward on the upper side and out of the water. Any suitable mechanism may be employed for transmitting power to the propelling means, as for instance, a main cross shaft 20, connected by a gear 21 to the main drive shaft. If desired, the lower ends of the propelling members may extend below the bottom of the vessel and serve to support the latter when it is upon dry land, so that the vessel may proceed along over the water until it reaches the shore, and as the propelling means would then contact with the bottom the vessel might be caused to travel directly up the beach and employed either as a land or water vehicle as the exigencies of the occasion might demand.

It is evident that many changes may be made in the specific structure of the propelling means, and the track and operating mechanism without departing from the spirit of my invention, which latter is defined in the appended claims.

Having thus described my invention, I claim as new and desire to secure by Letters Patent:

1. In combination, a vehicle body, an endless track supported in substantially a vertical plane, adjacent the side thereof, vertical members connecting the opposite sides of said track, longitudinal members extending substantially parallel to the upper and lower portions of the track, sprocket wheels journaled in the ends of said longitudinal members and having their outer edges lying substantially parallel to the curved portions of the track, an endless conveyor mounted upon said sprocket wheels, propelling means mounted upon said track, means for connecting said propelling means to said conveyor, arms carried by said conveying means and extending on opposite sides of the said track, and a plurality of anti-friction rollers carried by said arms, adapted to engage the outer and inner surfaces of said track.

2. In combination, a vehicle body, means for propelling said body, said means comprising a plurality of vertical members, an endless track secured to each side of the vertical members adjacent their ends, longitudinal members secured to said vertical members on each side thereof, sprocket wheels journaled in the ends of said longitudinal members, a chain surrounding said sprocket wheels and lying substantially parallel to said endless tracks, a plurality of blades secured to said chain, a plurality of anti-friction rollers carried by said blades and in engagement with the outer and inner sides of each of said tracks, and means for rotating one of said sprocket wheels.

3. In combination, a land or water vehicle body, a track formed of two members spaced apart and extending parallel, a longitudinal member surrounded by said track and rigidly secured thereto, sprocket wheels pivoted in the ends of said longitudinal member and having a portion of their circumferences parallel to said track, an endless chain surrounding said sprocket wheels and lying substantially parallel to the track throughout its length, a plurality of blades secured to said chain and having brackets extending on opposite sides of said track, each of said brackets carrying a friction roller in engagement with the outer surface of the track, a friction roller in engagement with the inner surface of the track, and means for rotating one of said sprocket wheels.

4. In combination, a vehicle body, an endless track supported in substantially a vertical plane adjacent one side thereof, said track composed of two substantially parallel members, vertical members intermediate the members of the track and rigidly secured to both of said track members, a longitudinal member extending substantially parallel to the upper and lower portions of the track members and secured to said vertical members, wheels journaled in the ends of said longitudinal members, an endless conveyer mounted upon said wheels, blades secured to said chain and mounted upon said track, two oppositely-disposed arms carried by each blade and lying upon opposite sides of the track, a plurality of anti-friction rollers carried by each of said arms and adapted to engage with the inner surface of the track, and a plurality of anti-friction rollers carried by each arm and adapted to engage with the outer surface of the track.

In testimony whereof I have signed my name to this specification in the presence of two subscribing witnesses.

JAMES ALLEN HILDEBRAND.

Witnesses:
L. GRANT TALCOTT,
G. W. TALCOTT.